United States Patent

Pedersen

[15] 3,650,599
[45] Mar. 21, 1972

[54] MEASURING INSTRUMENT AND READING DEVICE ASSEMBLY

[72] Inventor: Carl Pedersen, Morsovej 8 B, DK-2720 Vanlose, Denmark

[22] Filed: Jan. 28, 1971

[21] Appl. No.: 110,709

[52] U.S. Cl. ..................... 350/113, 116/129 K, 58/50, 58/126, 116/129 L
[51] Int. Cl. .................................................. G02b 17/06
[58] Field of Search .................... 350/110-116, 286, 350/287, 288, 299, 301; 116/129 K, 129 L; 58/50, 126, 127; 73/432, 431

[56] References Cited

UNITED STATES PATENTS 1,726,314  8/1929  Rose ........................... 116/129

2,430,616  11/1947  Pearson ........................ 350/112

Primary Examiner—David Schonberg
Assistant Examiner—Michael J. Tokar
Attorney—Watson, Cole, Grindle & Watson

[57] ABSTRACT

A clock is provided with a curved mirror encircling the scale of the clock, a further mirror is secured to the end of the shaft carrying the pointer of the clock and both mirrors are inclined with respect to the dial of the clock, a magnifying glass is positioned above the mirror secured to the shaft for magnifying the image of the end of the pointer and the section of the scale adjacent the pointer in the actual position thereof, reflected by the mirrors through the magnifying glass.

1 Claim, 2 Drawing Figures

Patented March 21, 1972  3,650,599

INVENTOR

Carl Pedersen

BY
Watson, Cole Grindle & Watson
ATTORNEY

MEASURING INSTRUMENT AND READING DEVICE ASSEMBLY

BACKGROUND OF THE INVENTION

In order to obtain an exact reading of a measuring instrument, e.g., a clock, it is known to use a magnifying glass which is slidable along the scale of the instrument so that it may be positioned above the end of the pointer and the part of the scale adjacent the pointer end in its actual position. The present invention is concerned with the problem of how to construct an assembly comprising a measuring instrument and a magnifying glass in order to avoid the movability of the magnifying glass because such moving is troublesome and makes it difficult to photograph the reading of the instrument.

SUMMARY OF THE INVENTION

A measuring instrument and reading device assembly comprising a shaft to which a pointer is secured and which is rotatable in accordance with the quantity to be measured and a scale arranged coaxially with the shaft. A curved mirror is arranged coaxially with the shaft at the remote side of the scale with respect to the shaft and with the reflecting surface facing the shaft and inclined towards the shaft. A further mirror is secured to the shaft in a position such that a light beam, received by the reflecting surface of said further mirror from said curved mirror and extending parallel to the longitudinal direction of the pointer, is reflected in the axial direction of the shaft. A magnifying glass is supported with the axis thereof coincident with the axis of the shaft. Due to the mirror arrangement the end of the pointer, no matter what position it occupies, and the section of the scale adjacent the pointer end can be observed through the stationary magnifying glass.

DESCRIPTION OF THE PREFERRED EMBODIMENT

Figure 1:
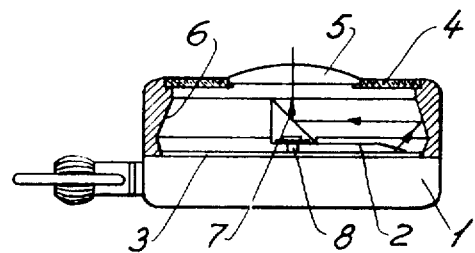
FIG. 1 is a side elevational view, partly in section, of a watch embodying the present invention.

Referring to FIG. 1 there is illustrated a measuring instrument in the form of a stop watch. The dial 3 of the watch is positioned below the pointer 2 of the watch and both the dial 3 and the pointer 2 are protected by means of a protecting glass 4 in the center of which a magnifying glass 5 is framed. However, the magnifying glass 5 may be mounted independent of the protecting glass 4 and may be arranged over or below the protecting glass 4.

The pointer 2 is secured to the end of a shaft 8 rotatable by the works of the watch. To the top end of the shaft 8 a small inclined mirror 7 is secured. The mirror 7 forms an angle of about 45° together with the dial 3 of the watch and moreover the normal to the mirror 7 is parallel with the plane defined by the shaft 8 and the pointer 2 so that a light beam extending parallel with the longitudinal direction of the pointer 2 will be reflected generally parallel with the axis of the shaft 8. It will be understood that the mirror 7 follows the movements of the pointer. A graded scale 9 is provided on the dial 3 coaxially with the axis of the shaft 8 and the radius of the scale corresponds to the length of the pointer 2. The scale may be lightened from a source of light (not shown) positioned above the watch, or the dial 3 may be transparent and be illuminated from below.

A curved reflecting surface 6 which accordingly forms a mirror encircles the arrangement comprising the mirror 7 and the pointer 2. In the embodiment illustrated the curved mirror 6 is frustoconical, but it may have a small transversal curvature. The mirror 6 reflects light beams from the scale generally radially inwards towards the axis of the pointer at a level above the pointer. That part of the light beams which extends in the plane defined by the pointer 2 and the shaft 8 will hit the small inclined mirror 7 and will be reflected upwards through the magnifying glass 5. By viewing through the magnifying glass 5 the viewer will accordingly see a magnified image of the end 11 of the pointer 2 and the part 12 of the scale positioned below the pointer end 11 in its actual position, cf. FIG. 2. The angles which the mirrors form with respect to each other and with respect to the dial 3 of the watch may easily be adjusted in such a way that the light beams follow the path indicated by arrows on FIG. 1. Moreover, the height of the magnifying glass 5 above the small mirror 7 may be adjusted in such a way that a sharp image of the relevant part of the scale may be seen. The height of the magnifying glass above the mirror 7 may be adjustable by means known per se in a direction perpendicular to the plane wherein the pointer moves. Moreover, the watch must of course be adapted to show the right time in spite of the fact that the shaft 8 supports the additional weight from the mirror 7, but the mirror 7 may be very light. A rough reading may be achieved by looking directly on the pointer 2.

A camara (not shown) may be arranged above the magnifying glass in order to take photos of the watch. On each picture it will then be possible to see both the scale and the pointer directly in the position which it occupies at the exposure so that a rough reading may be made in order to decide at which part of the scale the pointer points together with a magnified picture of the end 11 of the pointer and the adjacent part of the scale for an exact reading of the position of the pointer.

As mentioned above the mirror 6 may have a transversal curvature. If the mirror 6 e.g., has a concave form a certain magnification will be achieved, but also a certain distortion will occur dependent upon the exact shape of the mirror. However, by giving the small mirror 7 a slight curvature a compensation for such destortion may be achieved, and if the mirror 6 is formed and positioned in such a way that the reflecting surface thereof is positioned closely adjacent the scale the distorsion will be negligible.

Figure 2:
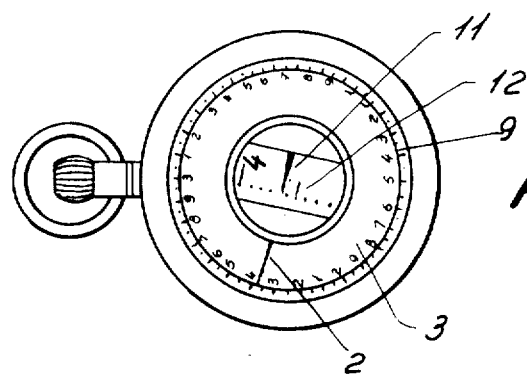
FIG. 2 is a top view of the watch illustrated in FIG. 1.

FIG. 2 also illustrates a photo taken by means of a camera arranged as explained above will look. On the scale a direct reading gives 2,3 and the reading appearing from the magnified image in the center gives the exact result 2,362.

Due to the face that the mirror 7 supported by the shaft 8 moves together with the pointer 2, the instrument may be photographed at any moment also while the pointer moves and the picture taken will show the position of the pointer in the moment of exposure. Moreover, it is possible to take a film of the reading of the instrument together with the readings of other instruments projected onto a common screen so that each picture of such a film will show coincident readings from all the instruments.

I claim:

1. Measuring instrument and reading device assembly, comprising a shaft to which a pointer is secured, said shaft being rotatable in accordance with the quantity to be measured, a scale arranged coaxially with said shaft and a magnifying glass for magnifying the image of the scale and the pointer, wherein a curved mirror is arranged coaxially with said shaft at the remote side of the scale with respect to the shaft and with the reflecting surface of said mirror facing said shaft and inclined towards said shaft, a further mirror secured to said shaft in a position such that a light beam received by the reflecting surface of said further mirror from said curved mirror and extending in the plane defined by said shaft and said pointer is reflected in the axial direction of said shaft, said magnifying glass being supported with the axis thereof coincident with the axis of said shaft.

* * * * *